(12) United States Patent
Disch et al.

(10) Patent No.: US 12,178,378 B2
(45) Date of Patent: Dec. 31, 2024

(54) DISHWASHER FOR CLEANING ITEMS OF WASHWARE IN THE FORM OF DRINKING VESSELS

(71) Applicant: ILLINOIS TOOL WORKS INC., Glenview, IL (US)

(72) Inventors: Harald Disch, Elzach (DE); Martin Schrempp, Biberach (DE); Adrian Boldt, Offenburg (DE); Benjamin Franz, Hohberg (DE); Roland Werner, Friesenheim (DE); David Reinhart, Ortenberg (DE); Björn Brodowski, Hohberg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/441,741

(22) Filed: Feb. 14, 2024

(65) Prior Publication Data

US 2024/0188787 A1    Jun. 13, 2024

Related U.S. Application Data

(63) Continuation of application No. 17/197,139, filed on Mar. 10, 2021, now Pat. No. 11,930,981.

(30) Foreign Application Priority Data

Mar. 12, 2020    (DE) ..................... 10 2020 106 839.5

(51) Int. Cl.
*A47L 15/00*    (2006.01)
*A47L 15/42*    (2006.01)
(Continued)

(52) U.S. Cl.
CPC ....... *A47L 15/0071* (2013.01); *A47L 15/0073* (2013.01); *A47L 15/0089* (2013.01);
(Continued)

(58) Field of Classification Search
None
See application file for complete search history.

(56) References Cited

U.S. PATENT DOCUMENTS

| | | |
|---|---|---|
| 1,502,131 A | 7/1924 | Vaudreuil |
| 1,617,021 A | 2/1927 | Mitchell |

(Continued)

FOREIGN PATENT DOCUMENTS

| | | |
|---|---|---|
| CN | 106073683 A | 11/2016 |
| CN | 107374538 A | 11/2017 |

(Continued)

*Primary Examiner* — Rita P Adhlakha
(74) *Attorney, Agent, or Firm* — THOMPSON HINE LLP (57) ABSTRACT

A dishwasher (1) for cleaning drinking vessels, wherein the dishwasher (1) has a treatment zone (3) and a conveyor apparatus (6) for conveying the items of washware (2) to be cleaned from an introduction region (4) of the dishwasher (1) through the treatment zone (3) to a removal region (5) of the dishwasher (1). The conveyor apparatus (6) is configured to convey a previously defined or definable group of items of washware (2) to be cleaned in batches from the introduction region (4) through the treatment zone (3) and then to feed the group of items of washware (2) as cleaned items of washware (2) to the removal region (5).

4 Claims, 5 Drawing Sheets

(51) Int. Cl.
*A47L 15/46* (2006.01)
*A47L 15/48* (2006.01)
*B65G 15/30* (2006.01)

(52) U.S. Cl.
CPC ....... *A47L 15/4257* (2013.01); *A47L 15/4295* (2013.01); *A47L 15/46* (2013.01); *A47L 15/48* (2013.01); *B65G 15/30* (2013.01); *A47L 2401/04* (2013.01); *A47L 2501/24* (2013.01)

(56) References Cited

U.S. PATENT DOCUMENTS

| | | | |
|---|---|---|---|
| 1,693,780 | A | 12/1928 | Griffiths |
| 1,814,508 | A | 7/1931 | Griffiths |
| 3,092,120 | A | 6/1963 | Hilger et al. |
| 3,460,878 | A | 8/1969 | Appel |
| 3,486,939 | A | 12/1969 | Pinckard |
| 3,886,959 | A | 6/1975 | Stott |
| 3,940,944 | A | 3/1976 | Lapeyre |
| 3,942,545 | A | 3/1976 | Flynn |
| 4,825,887 | A | 5/1989 | Nezworski |
| 4,832,064 | A | 5/1989 | Nezworski |
| 5,522,410 | A | 6/1996 | Meilleur |
| 6,276,373 | B1 | 8/2001 | Gotfried |
| 6,394,285 | B1 | 5/2002 | Arthurs |
| 9,962,061 | B2 * | 5/2018 | Firchau ............... A47L 15/0047 |
| 10,945,582 | B1 | 3/2021 | Morman et al. |
| 2002/0020435 | A1 | 2/2002 | Varpio |
| 2002/0053172 | A1* | 5/2002 | Castillejo ............. E04H 1/1222 52/36.2 |
| 2005/0072449 | A1 | 4/2005 | Alpert et al. |
| 2006/0060215 | A1 | 3/2006 | Lee |
| 2007/0125729 | A1 | 6/2007 | Krueger |
| 2008/0149149 | A1 | 6/2008 | Ryu et al. |
| 2011/0290804 | A1 | 12/2011 | Kohles et al. |
| 2012/0111372 | A1 | 5/2012 | Hesterberg et al. |
| 2012/0298146 | A1 | 11/2012 | Padtberg et al. |
| 2013/0099715 | A1 | 4/2013 | Fuhge |
| 2013/0340790 | A1 | 12/2013 | Lemley |
| 2014/0285075 | A1 | 9/2014 | Lundberg et al. |
| 2015/0107630 | A1 | 4/2015 | Varnals et al. |
| 2016/0007824 | A1 | 1/2016 | Maier et al. |
| 2016/0177493 | A1 | 6/2016 | Pittalis et al. |
| 2016/0324397 | A1 | 11/2016 | Jung et al. |
| 2016/0338566 | A1 | 11/2016 | Shabtai |
| 2018/0338666 | A1 | 11/2018 | Seewang et al. |
| 2019/0301073 | A1 | 10/2019 | Kessler et al. |
| 2021/0259509 | A1 | 8/2021 | Sperry |
| 2021/0369076 | A1 | 12/2021 | McGinness et al. |
| 2022/0079413 | A1 | 3/2022 | Longo et al. |

FOREIGN PATENT DOCUMENTS

| | | |
|---|---|---|
| CN | 109394119 A1 | 3/2019 |
| CN | 107233058 B | 6/2019 |
| CN | 109984703 A | 7/2019 |
| CN | 111166264 A | 5/2020 |
| CN | 112190207 A | 1/2021 |
| CN | 112315397 A | 2/2021 |
| DE | 2727067 A1 | 1/1979 |
| DE | 4136923 A1 | 5/1993 |
| DE | 4241064 A1 | 6/1994 |
| DE | 19644438 A1 | 4/1998 |
| DE | 20017158 U1 | 12/2000 |
| DE | 20317895 U1 | 2/2004 |
| DE | 102013226080 A1 | 6/2015 |
| DE | 102018103585 A1 | 9/2018 |
| DE | 102017129799 A1 | 6/2019 |
| DE | 102019119462 A1 | 1/2021 |
| EP | 0048519 B1 | 12/1984 |
| EP | 0600125 A1 | 6/1994 |
| EP | 0593876 B1 | 4/1997 |
| EP | 1532916 A2 | 5/2005 |
| EP | 2228000 A2 | 9/2010 |
| EP | 3015043 A1 | 5/2016 |
| EP | 3357398 A1 | 8/2018 |
| GB | 565183 A | 10/1944 |
| JP | 2002209691 A | 7/2002 |
| KR | 20040087763 A | 10/2004 |
| KR | 20060065289 A | 6/2006 |
| KR | 20060068402 A | 6/2006 |
| KR | 101757580 B1 | 7/2017 |
| KR | 20180068569 A | 6/2018 |
| WO | WO 2005044473 A1 | 5/2005 |
| WO | WO 2009011524 A1 | 1/2009 |
| WO | WO 2018087519 A1 | 5/2018 |
| WO | WO 2020186344 A1 | 9/2020 |
| WO | WO 2021011604 A1 | 1/2021 |
| WO | WO 2021116749 A1 | 6/2021 |

* cited by examiner

FIG. 5C

DISHWASHER FOR CLEANING ITEMS OF WASHWARE IN THE FORM OF DRINKING VESSELS

TECHNICAL FIELD

The present invention relates generally to the field of commercial dishwashing and specifically to a dishwasher as per the preamble of independent patent claim 1.

Accordingly, the invention relates in particular to a dishwasher for cleaning items of washware in the form of drinking vessels, in particular in the form of mugs, cups, glasses or bottles, wherein the dishwasher has at least one treatment zone and at least one conveyor apparatus for conveying the items of washware to be cleaned from an introduction region of the dishwasher through the at least one treatment zone of the dishwasher to a removal region of the dishwasher.

BACKGROUND

The introduction region of the dishwasher is in particular the dirty-side input region, which is configured so that the washware to be cleaned in the at least one treatment zone of the dishwasher can be input manually there. On the other hand, the removal region of the dishwasher is in particular the clean-side output region, which is configured to output the washware cleaned in the at least one treatment zone of the dishwasher in order that said washware can be removed manually.

Dishwashers having a conveyor apparatus of said type are normally used in the commercial sector. By contrast to domestic dishwashers, in which the washware to be cleaned remains positionally fixed in the dishwasher during cleaning, in such conveyor dishwashers, the washware is conveyed through different treatment zones of the machine.

A conveyor dishwasher of the aforementioned type is known for example from the document DE 19 644 438 A1. This conveyor dishwasher has, one after the other as seen in the conveying direction of the washware, a pre-cleaning zone with pre-cleaning nozzles for removing coarse soiling on the washware, at least one washing zone with washing nozzles for spraying washing liquid onto the washware, a pre-rinse zone with pre-rinse nozzles, and a fresh-water final rinse zone with final rinse nozzles. The final rinse nozzles spray final rinse liquid, in particular fresh water, onto the washware. The sprayed final rinse liquid passes into a pre-rinse tank, from which it is delivered to the pre-rinse nozzles by means of a pump line. The pre-rinse liquid sprayed by the pre-rinse nozzles flows back into the pre-rinse tank. Some of the pre-rinse liquid sprayed by the pre-rinse nozzles is directed into the washing tank of the last washing zone by way of a deflecting plate. A liquid cascade system allows liquid to flow, counter to the conveying direction of the washware, from the pre-rinse tank into the last washing tank and from the latter onward as far as a tank which collects the liquid sprayed by the pre-cleaning nozzles in the pre-cleaning zone.

The fact that, in conveyor dishwashers, the washware is conveyed through different treatment zones (in particular washing zones and final rinse zones) of the machine means that—by contrast to the batch processes of stationary box-type dishwashers, such as for example domestic dishwashers or under-counter machines—continuous operation is possible. However, the disadvantage of conveyor dishwashers is the need for a relatively large amount of space in the setup area (utility room).

However, there is an increasing need for using the advantages of a conveyor dishwasher in applications in which only a small setup area is available.

In this regard, nowadays, hotels, company canteens, public buildings, hospitals, schools and rest areas nearly always provide hot drinks machines, in particular self-service coffee machines of different models and sizes. Generally, said hot drinks machines are configured to fill cups with a selected hot drink, wherein however, plastic beakers are also used in installed vending machines in companies or public buildings.

On the other hand, on account of ecological considerations, the use of plastic beakers is increasingly being reduced, specifically in favor of reusable crockery (glasses, cups, etc.).

In order to clean the cups, glasses, etc. (also referred to below as "drinking vessel") after use, a conventional commercial dishwasher is generally used. Here, the dirty items of washware are gathered together, conveyed to the dishwasher, wherein the dishwasher is normally not situated directly in the vicinity of the hot drinks machine, cleaned in said dishwasher, and then brought back to the hot drinks station or the hot drinks machine again.

Accordingly, a switch from disposable crockery to reusable crockery in the hot drinks machines causes problems with regard to the logistics which are to be provided, in particular in terms of personnel for carrying out the individual process steps, as far as gathering together the dirty reusable crockery, filling a dishwasher which is normally provided externally, and providing the cleaned crockery again at the hot drinks machines is concerned.

The provision of a conventional conveyor dishwasher known from the prior art in the immediate vicinity of a hot drinks machine is not possible, since conveyor dishwashers of this type require a relatively large amount of space in the setup area (utility room), which is generally not to be found in the vicinity of hot drinks machines.

SUMMARY

Therefore, it is the object of the invention to further develop a dishwasher of the type mentioned in the introduction such that it has a particularly compact construction, in order that the dishwasher may also be used in applications in which, on account of a setup area not being available, conventional conveyor dishwashers cannot be used.

Said object is achieved according to the invention by a dishwasher as per independent patent claim 1, wherein advantageous refinements of the dishwasher are specified in the dependent claims.

Accordingly, the invention relates in particular to a dishwasher for cleaning items of washware in the form of drinking vessels, wherein the dishwasher has at least one treatment zone and at least one conveyor apparatus for conveying the items of washware to be cleaned from an introduction region of the dishwasher through the at least one treatment zone of the dishwasher to a removal region of the dishwasher.

According to the invention, it is provided here in particular that the conveyor apparatus is configured to convey a previously defined or definable group of items of washware to be cleaned in a batchwise manner from the introduction region through the at least one treatment zone and then to feed the group of items of washware as cleaned items of washware to the removal region.

Alternatively, the conveyor apparatus is configured to individually convey the items of washware to be cleaned from the introduction region through the at least one treatment zone and then feed them to the removal region as a cleaned item of washware.

The advantages achievable with the dishwasher according to the invention are clear: the dishwasher according to the invention makes it possible to selectively clean the fed-in washware individually, so that the dishwasher is suitable in particular for cleaning reusable drinking vessels, such as for example coffee cups, wherein the machine can be set up directly on a drinks machine, in particular hot drinks machine, or in the immediate vicinity of a drinks machine, in particular hot drinks machine.

Currently, drinks machines, in particular hot drinks machines, are generally provided with a device for outputting disposable containers which, after use, become waste and/or which, once legal provisions come into force, are subject to take-back obligation.

Furthermore, there are drinks machines which provide or output no containers and for which the user uses his or her own cup or the like, which he or she cleans himself or herself after use. In this way, an unnecessarily large amount of fresh water is used up if the user does not consciously attempt to be economical. Accordingly, an unnecessarily large amount of wastewater also accumulates and, moreover, paper towels or the like are required for drying the user's reusable container and in turn become waste.

As a result of the compact construction of the conveyor dishwasher according to the invention, it is also suitable in particular as a dishwasher for reusable drinking vessels, such as for example a dishwasher for coffee cups, which can be set up in the direct vicinity of the hot drinks machine/the coffee machine or is even a part-integrated constituent part of the hot drinks machine.

The conveyor dishwasher has an input region, into which the dirty washware (in particular drinking vessel) is introduced. The conveyor dishwasher furthermore has an output region, spatially separated from the input region, where the clean washware can be removed.

The washware (drinking vessels such as cups, glasses, etc.) can be fed, and also removed, individually (that is to say one after the other); loading in relatively small groups, however, is also basically possible.

The dishwasher according to the invention is in particular a type of hybrid dishwasher in which the technology of stationary box-type dishwashers for batch processes is combined with the technology of conveyor dishwashers which are configured for continuous operation. On the one hand, the dishwasher according to the invention offers the advantage of the stationary box-type dishwashers, which are designed for a batch process, while on the other hand, the advantage of conveyor dishwashers is also used. The required amount of space for setting up the dishwasher according to the invention corresponds at most to the required amount of space for a dishwasher in the form of a stationary box-type dishwasher, wherein at the same time, continuous operation of the dishwasher, as is known for conveyor dishwashers and is to be mentioned as an advantage there, is made possible.

In particular, in this respect, it is conceivable for the conveyor apparatus to be configured to selectively either convey a previously defined group of items of washware to be cleaned in a batchwise manner from the introduction region through the at least one treatment zone and then feed the group of items of washware as cleaned items of washware to the removal region, or convey the items of washware to be cleaned individually from the introduction region through the at least one treatment zone and then feed them to the removal region as a cleaned item of washware. In this way, individualized treatment and individualized feeding of the treated items of washware to the removal region are in particular possible.

In other words, a user of the dishwasher can feed his or her personal cup into the introduction region of the dishwasher, with it being ensured that said personal cup is also output so as to be identifiable as such at the removal region.

The dishwasher is thus suitable in particular for coffee shops where the customers bring along their own cup, with said cup however still having to be cleaned at the location prior to being filled with, for example, a hot drink. Then, the cup to be cleaned can, individually, be conveyed from the introduction region through the treatment zone and then fed to the removal region.

On the other hand, the dishwasher is also suitable for situations in which multiple items of washware have to be cleaned at the same time, as is the case for example if there is an accumulation of washware which is not to be individualized. In this case, the items of washware to be cleaned can be passed in a batchwise manner as a group through the treatment zone.

In a conceivable realization of the solution according to the invention, it is provided that the conveyor apparatus of the dishwasher has at least one conveying track, in particular in the form of a conveyor belt, wherein said at least one conveying track is configured to guide the items of washware individually through the at least one treatment chamber of the dishwasher. In this respect, it is conceivable in particular for the width of the conveying track to be selected to be correspondingly narrow. In a preferred realization of the dishwasher according to the invention, the at least one conveying track consequently has an effective width of preferably at most 30 cm and preferably of at most 15 cm.

For relatively large coffee shops in particular, it is advantageous for the conveyor apparatus to have at least two conveying tracks extending parallel to one another, in particular each in the form of a conveyor belt. In order for it to be possible for each of these two conveying tracks to individually convey the items of washware through the at least one treatment zone, a corresponding (correspondingly small) width of the conveying tracks should be selected, wherein each has in particular an effective width of at most 30 cm and preferably at most 15 cm.

In order for it to be possible to selectively convey either groups of items of washware in a batchwise manner through the at least one treatment zone or items of washware individually through the at least one treatment zone, it is provided according to one refinement of the dishwasher according to the invention that the conveyor apparatus has a first conveying track, in particular in the form of a conveyor belt, and at least one second conveying track, in particular in the form of a conveyor belt, wherein the first conveying track is assigned to individualized items of washware and wherein the at least one second conveying track is assigned to other items of washware. Here, the first conveyor track is configured to output the items of washware conveyed thereby through the at least one treatment zone of the dishwasher in the removal region of the dishwasher in particular in a manner spatially separated from the items of washware conveyed by the at least one second conveying track through the at least one treatment zone of the dishwasher.

According to embodiments of the solution according to the invention, the dishwasher has a control device that is configured to activate the at least one conveyor apparatus in such a way that, by way of the at least one conveyor apparatus, the items of washware to be cleaned are conveyed discontinuously from the introduction region of the dishwasher through the at least one treatment zone to the removal region of the dishwasher.

In this context, "discontinuously" means that, with the aid of the conveyor apparatus, for example, the items of washware to be cleaned are conveyed from the introduction region into the at least one treatment zone, wherein then, the conveyor apparatus stops and the items of washware are cleaned in the treatment zone (washing phase and final rinse phase and optionally subsequent drying phase) while fixed in position, wherein afterwards, the cleaned washware is conveyed to the removal region with the aid of the conveyor apparatus. The carrying out of different treatments temporally in succession in one and the same treatment zone results in the required amount of space for the dishwasher being reduced.

Alternatively, it is however self-evidently also conceivable for the dishwasher to have a control device that is configured to activate the at least one conveyor apparatus in such a way that, by way of the at least one conveyor apparatus, the items of washware to be cleaned are conveyed continuously and in particular at a previously defined or definable conveying speed through the at least one treatment zone. In this context, it is expedient to arrange at least two treatment zones one after the other, as seen in the conveying direction of the items of washware.

According to a further aspect of the present invention, the dishwasher is configured to output an item of washware input into the introduction region of the dishwasher and treated in the at least one treatment zone of the dishwasher in such an individualized manner in the removal region of the dishwasher that the item of washware treated in the at least one treatment zone is unambiguously assignable to an individual. This feature is helpful in particular if the dishwasher is used in a coffee shop where the customers can bring along their own mugs or other drinking vessels.

For realizing this embodiment, it is conceivable for the dishwasher to have, preferably in or at the introduction region, a system for identifying washware, wherein the system for identifying washware is configured to assign to an item of washware in or at the introduction region an identifier that allows unambiguous identification of the item of washware fed into the introduction region in the removal region of the dishwasher.

In this context, it is conceivable for the dishwasher to have, preferably in or at the introduction region, a system for identifying washware, wherein the system for identifying washware is configured to assign to an item of washware in or at the introduction region an identifier that allows unambiguous identification of the item of washware fed into the introduction region in the removal region of the dishwasher.

Different solutions are possible for the system for identifying washware. For example, the system for identifying washware may have an RFID device for the preferably automatic and contactless identification of an item of washware preferably in the introduction region of the dishwasher.

Alternatively or additionally, the system for identifying washware may have a barcode reader device for the preferably automatic and contactless identification of an item of washware preferably in the introduction region of the dishwasher.

Alternatively or additionally, the system for identifying washware may have a laser scanner device for the preferably automatic sensing of at least one surface-specific feature characterizing an item of washware and thus for the contactless identification of the item of washware preferably in the introduction region of the dishwasher.

It is conceivable here for the system for identifying washware to use, for the purpose of assigning an identifier to the item of washware preferably in the introduction region of the dishwasher, a surface microstructure of the corresponding item of washware as a distinguishing feature. In this way, on the basis of the surface microstructure, which is unique for each item of washware, it is possible to generate a characteristic bit sequence which forms the identifier or forms at least a part of the identifier that is assigned to the identifier, wherein the surface microstructure is recorded with high resolution preferably in the introduction region of the dishwasher at a previously specified or specifiable, defined position of an item of washware.

Alternatively or additionally, the system for identifying washware may have a QR code reader device for the preferably automatic and contactless identification of an item of washware preferably in the introduction region of the dishwasher.

Alternatively or additionally, the system for identifying washware may have an identification device based in particular on the YUV color model for the preferably automatic and contactless identification of an item of washware preferably in the introduction region of the dishwasher.

It is basically advantageous that the system for identifying washware is configured to sense, preferably automatically or selectively automatically, at least one feature of an item of washware fed in the introduction region of the dishwasher, wherein the system for identifying washware is also configured to use the at least one feature sensed in the introduction region of the dishwasher to recognize the corresponding item of washware in the removal region of the dishwasher and preferably to tag it appropriately or to individualize, singularize or separate it from other items of washware in the removal region.

According to realizations of the dishwasher according to the invention, the at least one treatment zone is configured to subject at least one item of washware fed to the at least one treatment zone via the at least one conveyor apparatus, temporally in succession, to a washing treatment and a downstream final rinse treatment and optionally drying downstream of the final rinse treatment.

Alternatively, the dishwasher may have at least one first treatment zone, which is in the form of a washing zone, and at least one second treatment zone, which is downstream of the at least one first treatment zone—as seen in the conveying direction of the items of washware—and is in the form of a rinse zone, in particular a final rinse zone, wherein optionally the dishwasher also has at least one third treatment zone, which is in the form of a drying zone and is downstream of the at least one second treatment zone—as seen in the conveying direction of the items of washware.

According to realizations of the dishwasher according to the invention, it is provided that the dishwasher has a further conveyor apparatus for preferably automatically and in particular selectively conveying a cleaned item of washware from the removal region of the dishwasher to a dispenser, in particular to a dispenser for a cold or hot drink of a drinks machine or a coffee machine, wherein the dishwasher in particular also has a device for positioning and/or orienting the item of washware with respect to the dispenser.

It is furthermore conceivable for the dishwasher to be assigned a deposit system for returning an item of washware introduced or to be introduced into the introduction region of the dishwasher, in particular to an operator of the dishwasher, or for reusing the item of washware introduced or to be introduced into the introduction region of the dishwasher.

Preferably, the input region and the output region, which are spatially separated from one another, are situated on opposite machine sides.

An alignment of the washware and also an orientation of the washware may be necessary for the transfer to the conveyor apparatus. Correct alignment and/or orientation can be generated mechanically in the dishwasher or, more simply, be ensured by the user when loading, that is to say when introducing the washware into the input region. As an aid, the required orientation can be indicated for example visually.

According to a preferred embodiment of the present invention, the input region has for this purpose an access opening with a guideway which corresponds to the drinking vessel to be cleaned, wherein the guideway predefines an orientation and possibly an alignment of the washware (drinking vessel) during the introduction of the washware (drinking vessels) into the input region of the dishwasher.

According to embodiments of the dishwasher according to the invention, the output region of the dishwasher is in the form of a storage region in which a previously defined or definable number of cleaned drinking vessels can be stored temporarily. Alternatively or additionally, it is conceivable for the input region to be in the form of a storage region, for the purpose of temporarily storing drinking vessels which are yet to be cleaned.

It is particularly preferably provided that the dishwasher has a storage region in which a previously defined or definable number of cleaned drinking vessels can be stored temporarily, wherein the conveyor apparatus is configured to convey as required drinking vessels from the storage region to the output region of the dishwasher.

This solution has the advantage that, in the output region, a drinking vessel is output only if it is required by the user. Soiling of already cleaned washware in the output region is thus ruled out.

A plate onto which the conveyor apparatus pushes the cleaned drinking vessels (for example cups, mugs and the like) one after the other may serve as the storage region. For this purpose, the conveyor apparatus may have for example a conveyor belt.

If the dishwasher is used in combination with a hot drinks machine, it is advantageous for the drinking vessel to be pre-heated in the storage region or at least in the output region of the dishwasher. In this context, it is conceivable for example to provide a corresponding heating device in the storage region or in the output region. Heating coils below or radiant heaters above the storage region and/or output region may serve as the heating device.

Moreover, the heating device may be arranged in such a way that the drinking vessels are already being heated on their way out of the final rinse zone to the output region or storage region. In a particularly advantageous embodiment of the invention, the heating device may also be used for drying the drinking vessels.

According to a further aspect of the present invention, it is provided that the dishwasher is in the form of a reverse vending machine for reusable drinking vessels, in particular coffee cups or the like, and preferably has a refund device. The refund may be realized in the form of cash, a voucher, a chip card or by means of a cashless credit system, etc.

According to one refinement of the dishwasher according to the invention, the latter has a control device for activating the conveyor apparatus and the activatable components (pump, valve, heating device, etc.) assigned to the washing zone and final rinse zone. The control device is preferably configured to coordinate the conveyance of the washware through the treatment zones in a manner dependent on the presence or absence of drinking vessels in the input region and/or output region.

The invention furthermore relates to an arrangement having a drinks machine and a dishwasher of the aforementioned type according to the invention. The drinks machine is for example a dispenser for hot drinks (hot drinks machine). It goes without saying that the drinks machine may also be designed in the form of a cold drinks machine. Combined forms are also conceivable and are covered.

The combination of drinks machine and dishwasher has the advantage that it is no longer necessary for the drinks machine to have—as is customary—a dispensing chute for disposable drinks containers stored there. Therefore, it is also the case that a more compact construction of the drinks machine is possible, and at the same time, no or at least less waste accumulates during the operation of the drinks machine.

The dishwasher according to the invention may in particular be in the form of an add-on unit for drinks machines. Such an add-on unit is to be understood as being, in relation to the drinks machines, a separate, modular functional unit.

Alternatively, however, it is also conceivable for the dishwasher according to the invention and the drinks machine to be combined in the form of an overall system.

In particular in the case of a combination in the form of an overall system, the final rinse zone or the washing zone of the dishwasher and the drinks machines may be assigned a common water heater. Here, the invention is based on the realization that both drinks machines and dishwashers use hot water.

Various advantages can be achieved by the drinks-preparing device of the drinks machine and the dishwasher having a common hot water-producing means. A common heating device for producing hot water is advantageous not only from an energy perspective, but also because of the lower technical outlay. It also saves space, whereby the compactness of the combination of dishwasher and drinks machine can be further increased. Continuous-flow heaters or boiler systems, which are preferably integrated into the drinks-preparing device of the drinks machine, generally serve as the heating device.

Furthermore, with regard to simplifying the system and with regard to the system being rendered as user-friendly as possible, it is advantageous if the drinks machine and the dishwasher are assigned a common fresh-water connection and/or a common connection for electrical energy.

The dishwasher according to the invention is—as already stated—designed in particular for coffee shops. On account of the compact construction, the dishwasher according to the invention can be integrated for example into the counter design of a coffee shop. The dishwasher may be embodied in particular as an under-counter or preferably as a top-counter machine and have dimensions adapted to a counter size.

The footprint of the dishwasher preferably has dimensions of at most 700 mm×1000 mm and preferably at most 500 mm×600 mm and even more preferably at most 350 mm×600 mm. With these dimensions, the dishwasher can be placed without any problems on a normal counter, which generally has a depth of 600 mm. A relatively small structural height can also be realized on account of the hybrid configuration of the dishwasher. According to embodiments, the height of the dishwasher is at most 500 mm.

According to realizations of the dishwasher, the latter has a door, for example a tambour door, for closing as required an access opening leading to the introduction region of the dishwasher. Instead of a door, a splash curtain (splash blanket) may also be provided at the access opening.

It is advantageous in particular that the at least one treatment zone is assigned a suction-extraction device for the suction extraction of vapor, and/or that the at least one treatment zone is assigned a splash guard for preventing vapor and/or liquid from escaping from the at least one treatment zone.

The access opening preferably has a height of at most 300 mm and preferably at most 250 mm and a width of at most 500 mm and preferably at most 350 mm. This makes it possible for drinking vessels to be able to be introduced into the introduction region singly or one next to the other.

According to embodiments of the dishwasher according to the invention, use is made of a spiral-shaped or helical conveying device and/or a carousel-type conveying device as the conveyor apparatus. A revolving plate, for example, is suitable as a carousel-type conveying device, for allowing circular conveyance of the washware.

The dishwasher preferably has a first door, preferably in the form of a tambour door, for closing as required the access opening to the introduction region of the dishwasher and preferably also has a second door, preferably in the form of a tambour door, for closing as required an access opening to the removal region of the dishwasher.

Various embodiments of the dishwasher according to the invention will be described in more detail below with reference to the illustrations in FIG. 2 to FIG. 5.

BRIEF DESCRIPTION OF THE DRAWINGS

The invention will be described in more detail below on the basis of the appended drawing.

In the drawing:

FIG. 2A shows, schematically and in an isometric view, a second exemplary embodiment of the dishwasher according to the invention, specifically in a state in which a door of the dishwasher to the introduction region is open and no item of washware has been received in the introduction region;

FIG. 2B shows, schematically and in a view of the introduction region, the second exemplary embodiment of the dishwasher according to the invention as per FIG. 2a;

FIG. 3B shows, schematically and in a view of the introduction region, the third exemplary embodiment of the dishwasher according to the invention as per FIG. 3a;

FIG. 4B shows, schematically and in a view of the introduction region, the fourth exemplary embodiment of the dishwasher according to the invention as per FIG. 4a;

FIG. 4C shows, schematically and in an isometric view, the fourth exemplary embodiment of the dishwasher according to the invention, specifically in a state in which a door of the dishwasher to the introduction region is closed;

DETAILED DESCRIPTION

Figure 1:
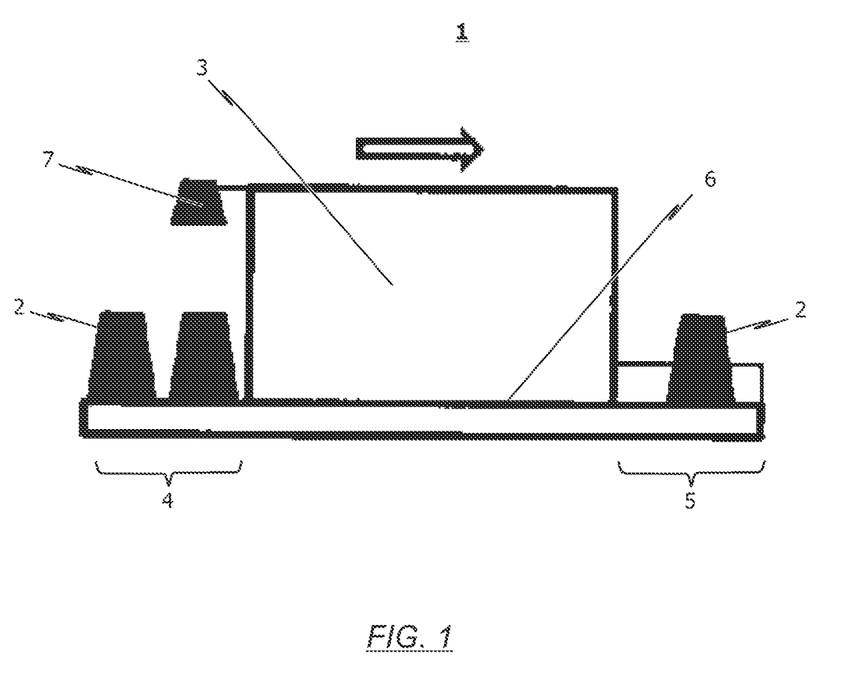
FIG. 1 shows, schematically and in a side view, a first exemplary embodiment of the dishwasher according to the invention.
Figures 2A, 2B:
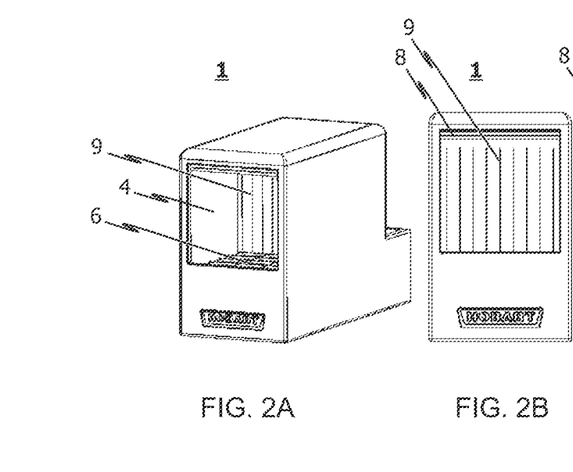
Figure 2C:
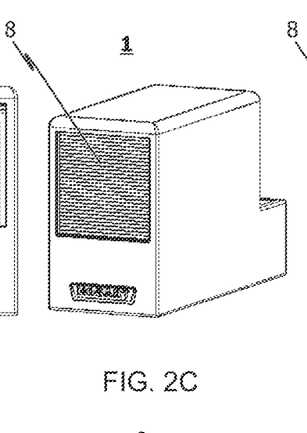
FIG. 2C shows, schematically and in an isometric view, the second exemplary embodiment of the dishwasher according to the invention, specifically in a state in which a door of the dishwasher to the introduction region is closed.
Figures 2D, 2E:
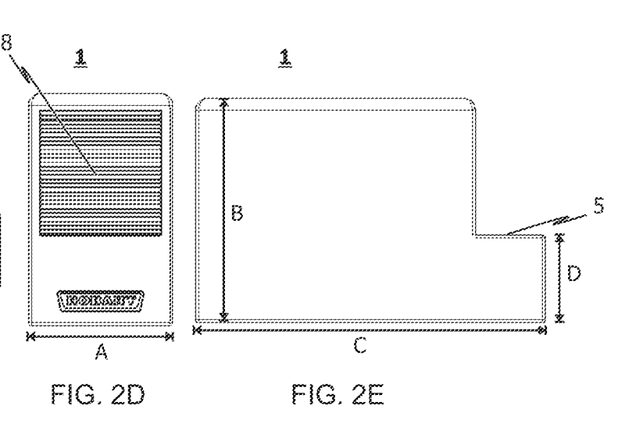
FIG. 2D shows, schematically and in a view of the introduction region, the second exemplary embodiment of the dishwasher according to the invention as per FIG. 2c.
FIG. 2E shows, schematically and in a side view, the second exemplary embodiment of the dishwasher according to the invention.
Figure 2F:
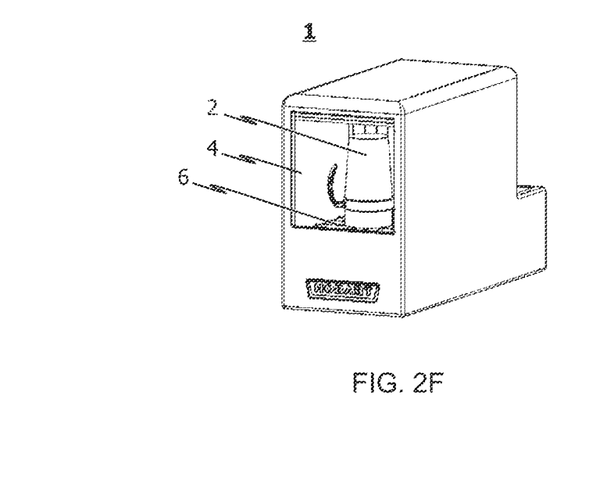
FIG. 2F shows, schematically and in an isometric view, the second exemplary embodiment of the dishwasher according to the invention, specifically in a state in which a door of the dishwasher to the introduction region is open and at least one item of washware has been received in the introduction region.
Figure 2G:
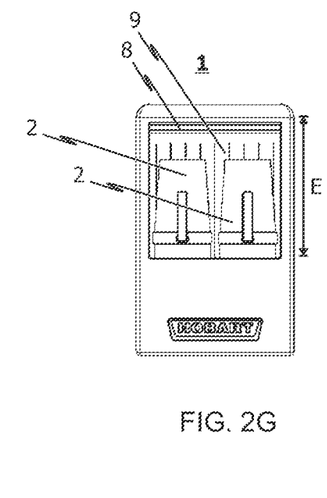
FIG. 2G shows, schematically and in a view of the introduction region, the second exemplary embodiment of the dishwasher according to the invention as per FIG. 2f.
Figure 2H:
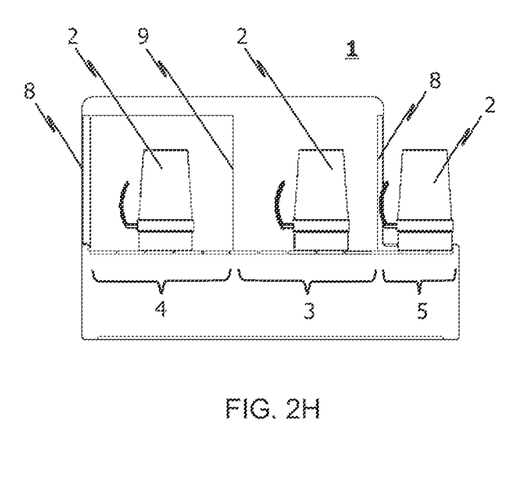
FIG. 2H shows, schematically and in a sectioned side view, the second exemplary embodiment of the dishwasher according to the invention, specifically in a state in which at least one item of washware is present in the introduction region, in the at last one treatment zone and in the removal region of the dishwasher in each case.
Figure 3A:
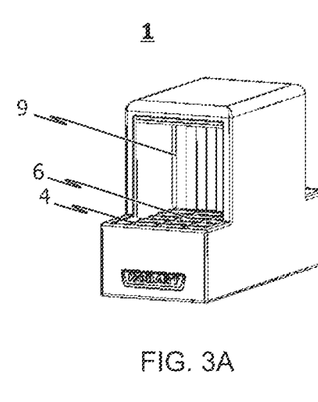
FIG. 3A shows, schematically and in an isometric view, a third exemplary embodiment of the dishwasher according to the invention, specifically in a state in which a door of the dishwasher to the introduction region is open and no item of washware has been received in the introduction region.
Figure 3B:
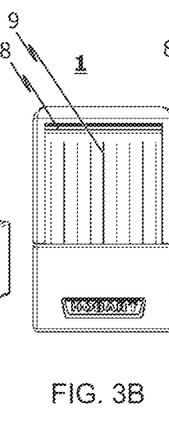
Figure 3C:
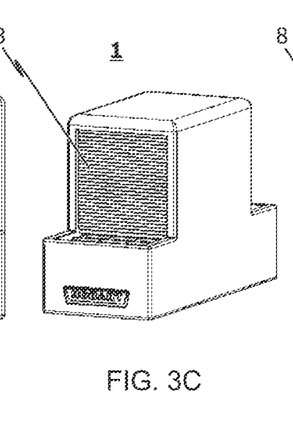
FIG. 3C shows, schematically and in an isometric view, the third exemplary embodiment of the dishwasher according to the invention, specifically in a state in which a door of the dishwasher to the introduction region is closed.
Figure 3D:
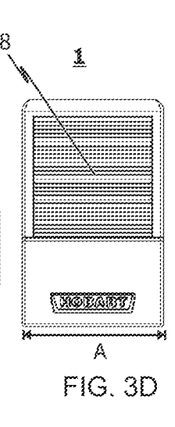
FIG. 3D shows, schematically and in a view of the introduction region, the third exemplary embodiment of the dishwasher according to the invention as per FIG. 3c.
Figure 3E:
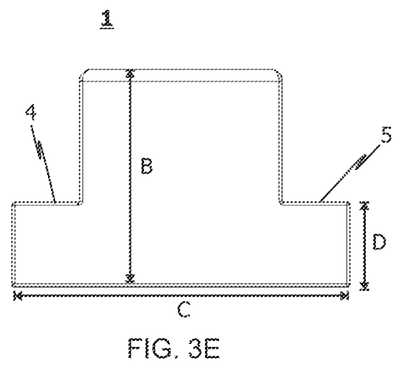
FIG. 3E shows, schematically and in a side view, the third exemplary embodiment of the dishwasher according to the invention.
Figure 3F:
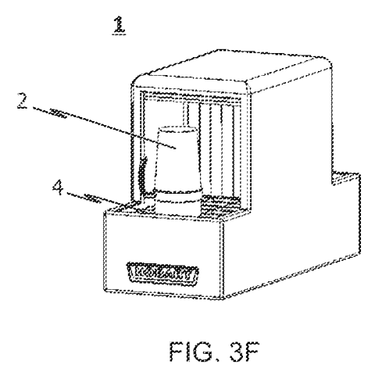
FIG. 3F shows, schematically and in an isometric view, the third exemplary embodiment of the dishwasher according to the invention, specifically in a state in which a door of the dishwasher to the introduction region is open and at least one item of washware has been received in the introduction region.
Figure 3G:
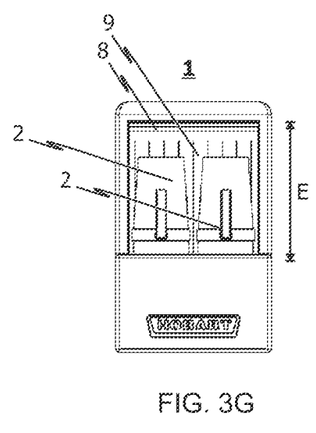
FIG. 3G shows, schematically and in a view of the introduction region, the third exemplary embodiment of the dishwasher according to the invention as per FIG. 3f.
Figure 3H:
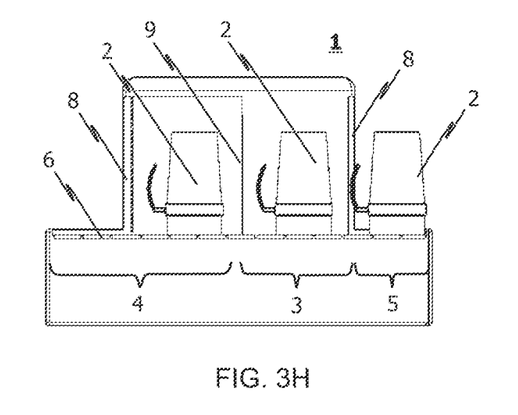
FIG. 3H shows, schematically and in a sectioned side view, the third exemplary embodiment of the dishwasher according to the invention, specifically in a state in which at least one item of washware is present in the introduction region, in the at last one treatment zone and in the removal region of the dishwasher in each case.
Figure 4A:
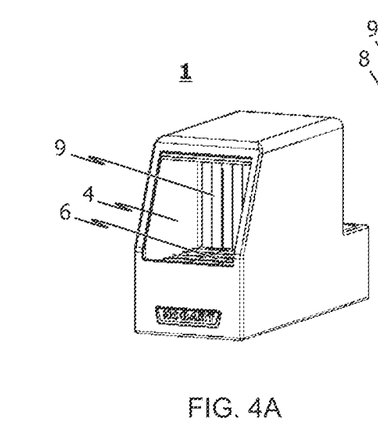
FIG. 4A shows, schematically and in an isometric view, a fourth exemplary embodiment of the dishwasher according to the invention, specifically in a state in which a door of the dishwasher to the introduction region is open and no item of washware has been received in the introduction region.
Figures 4B, 4C:
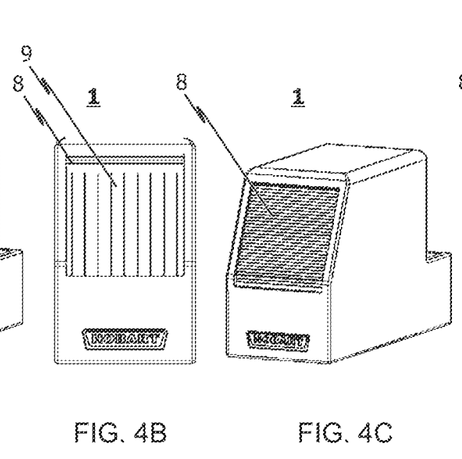
Figures 4D, 4E:
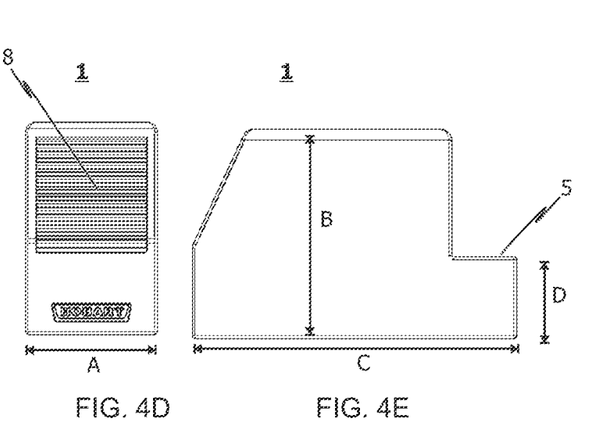
FIG. 4D shows, schematically and in a view of the introduction region, the fourth exemplary embodiment of the dishwasher according to the invention as per FIG. 4c.
FIG. 4E shows, schematically and in a side view, the fourth exemplary embodiment of the dishwasher according to the invention.
Figure 4F:
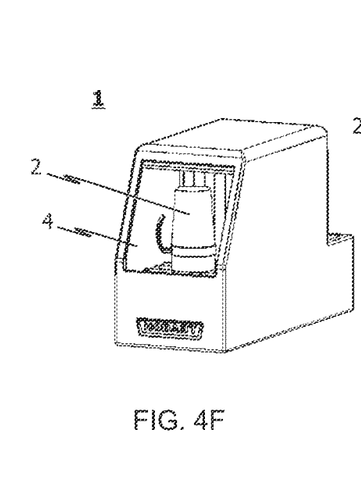
FIG. 4F shows, schematically and in an isometric view, the fourth exemplary embodiment of the dishwasher according to the invention, specifically in a state in which a door of the dishwasher to the introduction region is open and at least one item of washware has been received in the introduction region.
Figure 4G:
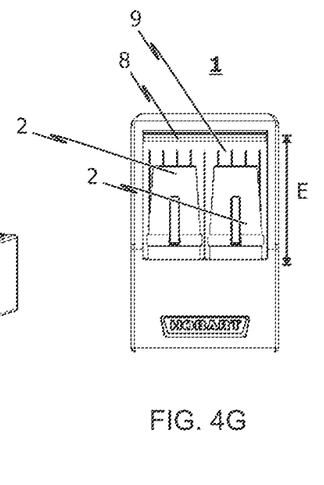
FIG. 4G shows, schematically and in a view of the introduction region, the fourth exemplary embodiment of the dishwasher according to the invention as per FIG. 4F.
Figure 4H:
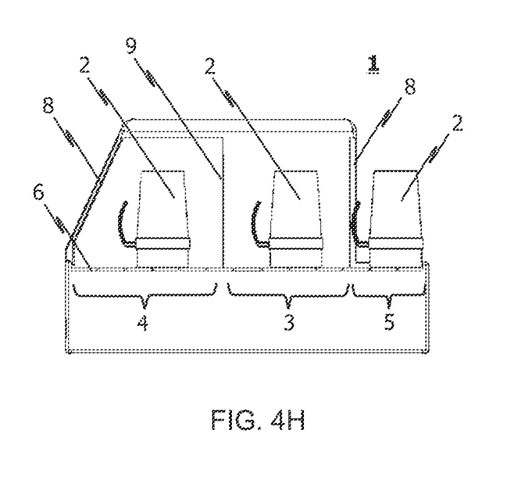
FIG. 4H shows, schematically and in a sectioned side view, the fourth exemplary embodiment of the dishwasher according to the invention, specifically in a state in which at least one item of washware is present in the introduction region, in the at last one treatment zone and in the removal region of the dishwasher in each case.

FIG. 1 shows, schematically and in a side view, a first exemplary embodiment of the dishwasher 1 according to the invention. The dishwasher 1 is suitable in particular for cleaning items of washware 2 in the form of drinking vessels, in particular in the form of mugs, cups, glasses or bottles.

For this purpose, the dishwasher 1 has at least one treatment zone 3 and at least one conveyor apparatus 6 for conveying the items of wash ware 2 to be cleaned from an introduction region 4 of the dishwasher 1 through the at least one treatment zone 3 of the dishwasher 1 to a removal region 5 of the dishwasher 1.

Here, the conveyor apparatus 6 is configured to convey a previously defined or definable group of items of washware 2 to be cleaned in a batchwise manner from the introduction region 4 through the at least one treatment zone 3 and then to feed the group of items of washware 2 as cleaned items of washware 2 to the removal region 5, or to convey the items of washware 2 to be cleaned individually from the introduction region 4 through the at least one treatment zone 3 and then to feed them to the removal region 5 as a cleaned item of washware 2.

Specifically, the dishwasher 1 has a housing in which a washing zone and a final rinse zone are accommodated as treatment zones 3.

The final rinse zone is a fresh-water final rinse zone, in which fresh water with final rinse agent possibly added is sprayed onto the washware to be treated.

In this context, it is conceivable for yet a further treatment zone 3, in the form of a pump-action final rinse zone, to be provided between the washing zone and the final rinse zone. In said pump-action final rinse zone, the liquid sprayed previously in the fresh-water final rinse zone is sprayed onto the washware with recirculating action.

The individual treatment zones 3 of the dishwasher 1 may be arranged in a manner spatially separated from one another, wherein a corresponding splash guard, for example in the form of a curtain, may be provided between the treatment zones 3 so as to prevent liquid from splashing excessively and the washware from becoming dirty again.

In order, however, to achieve as compact a design of the dishwasher 1 as possible, it is advantageous that the treatment zones 3 or at least some treatment zones 3 of the dishwasher 1 are formed in a common treatment chamber of the dishwasher 1. In this case, the dishwasher 1 should have a control device that is configured to activate the at least one conveyor apparatus 6 in such a way that, by way of the at least one conveyor apparatus 6, the items of washware 2 to be cleaned are conveyed discontinuously from the introduction region 4 of the dishwasher 1 through the at least one treatment zone 3 to the removal region 5 of the dishwasher 1.

The exemplary embodiment of the dishwasher 1 according to the invention, as is illustrated by way of example in FIG. 1, is distinguished in that it has an introduction region 4 into which the washware to be cleaned in the dishwasher 1 can be input/inserted manually. Provision is furthermore made of a removal region 5 which is formed separately from said introduction region and via which the washware treated/cleaned in the treatment zones 3 of the dishwasher 1 is output.

The introduction region 4 and the removal region 5 are formed in particular on opposite sides of the housing of the dishwasher 1.

The dishwasher 1 also has the aforementioned at least one conveyor apparatus 6, by way of which the (dirty) washware input into the introduction region 4 is conveyed through the treatment zones 3 of the dishwasher 1 to the removal region 5.

Owing to the compactness of the dishwasher 1, the loading opening of the introduction region 4 may be correspondingly small. If—as is the case in the exemplary embodiments shown in the drawings—the dishwasher 1 serves for cleaning drinking vessels, in particular reusable drinking vessels, such as coffee cups, the loading opening of the introduction region 4 may be a little higher than the drinking vessel 2 to be treated.

Although not illustrated in FIG. 1, the access opening of the introduction region 4 of the dishwasher 1 may be assigned a guideway corresponding to the drinking vessel 2 to be cleaned, so as to predefine an orientation of the drinking vessel 2 during the introduction of the drinking vessel 2 into the introduction region 4.

The removal region 5 of the dishwasher 1 as per FIG. 1 is in the form of a storage region and serves for the temporary storage of a previously defined or definable number of cleaned drinking vessels 2. In the same way, the introduction region 4 of the dishwasher 1 may likewise be in the form of a storage region, so as to temporarily store a previously defined or definable number of drinking vessels 2 to be cleaned. This makes possible so-called batch operation of the dishwasher 1.

Preferably, the dishwasher 1 has a control device for correspondingly activating the conveyor apparatus 6 and the activatable components assigned to the washing zone and final rinse zone. The control device is configured to activate the conveyor apparatus 6 of the dishwasher 1, and possibly the activatable components of the washing zone and final rinse zone, in a manner dependent on a presence or absence, or in a manner dependent on a number, of drinking vessels 2 in the introduction region 4 and/or removal region 5.

Although not illustrated in FIG. 1, it is conceivable for the dishwasher 1 to be in the form of a reverse vending machine for reusable drinking vessels 2, in particular coffee cups, and preferably to have a corresponding refund device.

The dishwasher 1 according to the invention, if used in combination with a drinks machine, in particular hot drinks machine, makes possible the use of reusable crockery and thereby avoids waste, etc.

The solution according to the invention allows time used for handling to be saved. Dirty washware (drinking vessels 2) pass directly into the dishwasher 1, that is to say dirty drinking vessels 2 are not conveyed into a kitchen and clean drinking vessels 2 are not conveyed from the kitchen back to the hot drinks machine.

The invention furthermore provides for saving of space, since no space around the hot drinks machine is required for storing clean and dirty drinking vessels 2.

The dishwasher 1 according to the invention is suitable in particular as a special-purpose dishwasher 1 for coffee cups that is situated in a coffee shop or similar setup location, ideally in the direct vicinity of the coffee machine or even as a constituent part thereof. The dishwasher 1 has an input location in which the dirty crockery is introduced and has an output location, separated from said input location, where the clean crockery can be removed. The cups, glasses, etc. can be fed, and also removed, individually (that is to say one after the other); loading in relatively small groups should, if appropriate, also be possible.

Preferably, the input location is situated on a dirty side and the output location is situated on a spatially separated clean side. For example, a cup can be introduced on one side by a customer and removed on the opposite side by the same customer or by another customer or even by a server.

For example, the dishwasher 1 according to the invention is suitable for use in coffee shop chains, such as for example Starbucks: A customer enters the coffee shop with "his" or "her" cup and wishes to have "his" or "her" cup refilled.

The cup is automatically washed by the dishwasher 1 and is then refilled. In order that the customer also really gets "his" or "her" own cup back, this is tagged—either in an analog or digital manner.

For realizing this embodiment, it is conceivable for the dishwasher 1 to have, preferably in or at the introduction region 4, a system 7 for identifying washware, wherein the system 7 for identifying washware is configured to assign to an item of washware 2 in or at the introduction region 4 an identifier that allows unambiguous identification of the item of washware fed into the introduction region 4 in the removal region 5 of the dishwasher 1.

In this respect, it is conceivable for the dishwasher 1 to have, preferably in or at the introduction region 4, a system 7 for identifying washware, wherein the system 7 for identifying washware is configured to assign to an item of washware 2 in or at the introduction region 4 an identifier that allows unambiguous identification of the item of washware fed into the introduction region 4 in the removal region 5 of the dishwasher 1.

It is basically advantageous that the system 7 for identifying washware is configured to sense, preferably automatically or selectively automatically, at least one feature of an item of washware fed in the introduction region 4 of the dishwasher 1, wherein the system 7 for identifying washware is also configured to use the at least one feature sensed in the introduction region 4 of the dishwasher 1 to recognize the corresponding item of washware 2 in the removal region 5 of the dishwasher 1 and preferably to tag it appropriately or to individualize, singularize or separate it from other items of washware 2 in the removal region 5.

In particular, the dishwasher 1 according to the invention is configured, on account of its structural shape and structural size, to be integrated into the counter area of, for example, a coffee shop, such that the dirty cup can be put into the machine by a customer in a region in front of the counter, and the clean cup, after completion of a rinsing process, can then be removed from the machine by a member of staff behind the counter in order then to use it directly for refilling according to the customer's order.

The removal region 5 of the dishwasher 1 may additionally be equipped with a type of conveyor belt/conveying device by way of which it is possible for the clean washware to be transported from the actual removal region 5 into an additional storage region, for example next to the dishwasher 1 or on the other side of the coffee machine, in order in this way for the capacity, or the maximum possible number of cups and glasses which can be circulating, to be increased by an arbitrary amount without the size of the actual dishwasher 1 having to be enlarged for this purpose.

In particular, in this respect, it is conceivable that the clean washware is not conveyed, by the additional conveyor belt/conveying device, into a separate storage region, but rather there is a direct connection to a coffee machine (the cup also being rotated through 180° so that the opening faces upward), with the result that the clean cup, directly after completion of a rinsing process, can be filled with the drink according to the customer's order in a fully automatic manner.

Further embodiments of the dishwasher 1 according to the invention will be described in more detail below with reference to the illustrations in FIGS. 2A-2H, 3A-3H, 4A-4H and 5A-5C.

Specifically, these embodiments are each in the form of top-counter machines, and so these can be placed on the counter of, for example, a coffee shop without any problems. The embodiments of the dishwasher 1 according to the invention are configured to convey items of washware 2 in a batchwise manner from the introduction region 4 through the at least one treatment zone 3 and then to feed the items of washware 2 as cleaned items of washware 2 to the removal region 5.

Here, the dishwasher may have a door 8, in particular tambour door, for closing as required an access opening to the introduction region 4 of the dishwasher. The door 8 may be manually or automatically actuatable. In the case of automatic actuation of the door 8, the introduction region may be assigned a sensor system which is configured to sense the presence of an item of washware 2 in the introduction region 4, wherein, upon sensing an item of washware 2 in the introduction region 4, the sensor system activates a door mechanism in order for the door 8 to be closed and for a treatment program of the dishwasher 1 to be started.

The dishwashers according to the embodiments shown in FIGS. 2A-2H, 3A-3H, 4A-4H and 5A-5C are consequently suitable in particular for coffee shops where the customers bring along their own cup, with said cup however still having to be cleaned at the location prior to being filled with, for example, a hot drink. Then, the cup to be cleaned can, individually, be conveyed from the introduction region 4 through the treatment zone 3 and then fed to the removal region 5.

On the other hand, the dishwashers 1 are also suitable for situations in which multiple items of washware have to be cleaned at the same time, as is the case for example if there is an accumulation of washware 2 which is not to be individualized. In this case, the items of washware 2 to be cleaned can be passed in a batchwise manner as a group through the treatment zone 5.

In the embodiments shown in FIGS. 2A-2H, 3A-3H and 4A-4H, it is provided that the conveyor apparatus 6 of the dishwasher 1 has a conveying track, in particular in the form of a conveyor belt, wherein said conveyor track is configured to guide the items of washware 2 individually or in pairs through the at least one treatment chamber 3 of the dishwasher 1. Here, the width of the conveying track is selected to be correspondingly narrow. In preferred realizations of the dishwasher 1 according to the invention, the conveying track has an effective width of preferably at most 30 cm and preferably of at most 15 cm.

The embodiments shown in FIGS. 2A-2H, 3A-3H, 4A-4H and 5A-5C of the dishwasher 1 according to the invention have a control device that is configured to activate the conveyor apparatus 6 in such a way that, by way of the conveyor apparatus 6, the items of washware 2 to be cleaned are conveyed discontinuously from the introduction region 4 of the dishwasher 1 through the at least one treatment zone 3 to the removal region 5 of the dishwasher 1.

Here, with the aid of the conveyor apparatus 6, the items of washware 2 to be cleaned are conveyed from the introduction region 4 into the at least one treatment zone 3, wherein then, the conveyor apparatus 6 stops and the items of washware 2 are cleaned in the treatment zone 3 (washing phase and final rinse phase and optionally subsequent drying phase) while fixed in position, wherein afterwards, the cleaned washware 2 is conveyed to the removal region 5 with the aid of the conveyor apparatus 6.

Figure 5A:
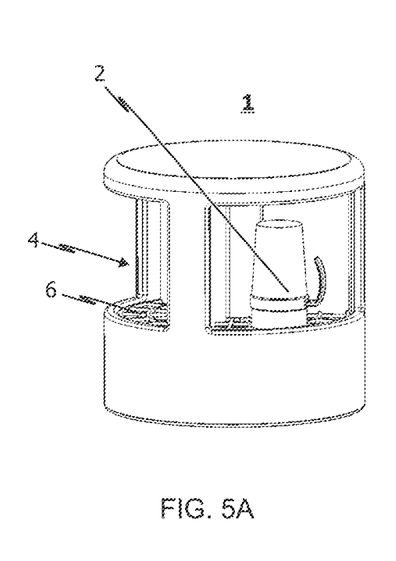
FIG. 5A shows, schematically and in an isometric view, a fifth exemplary embodiment of the dishwasher according to the invention, specifically in a state in which one item of washware has been received in the removal region of the dishwasher.
Figure 5B:
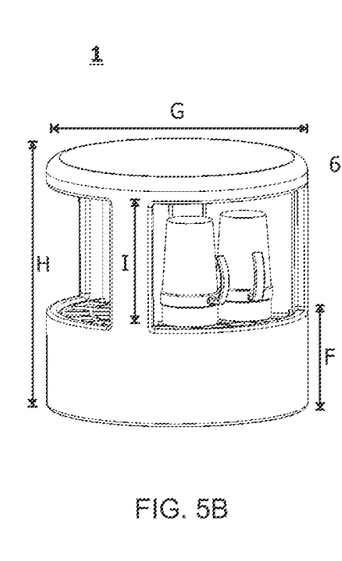
FIG. 5B shows, schematically and in an isometric view, the fifth exemplary embodiment of the dishwasher according to the invention, specifically in a state in which two items of washware have been received in the removal region of the dishwasher.
Figure 5C:
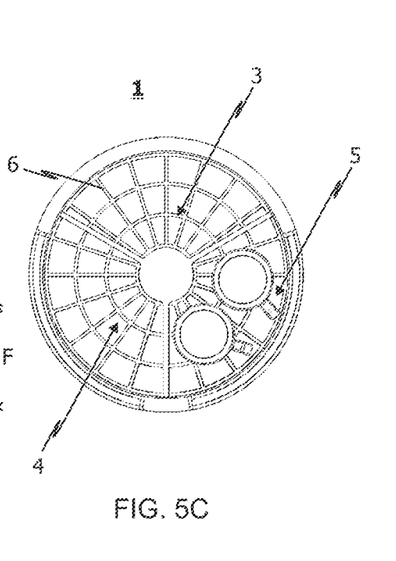
FIG. 5C shows, schematically and in a sectioned plan view, the fifth exemplary embodiment of the dishwasher according to the invention as per FIG. 5B.

FIGS. 5A-5C show an embodiment of the dishwasher 1 according to the invention in which use is made of a carousel-type conveying device 6 as the conveyor apparatus 6. A revolving plate, for example, is suitable as a carousel-type conveying device, for allowing circular conveyance of the washware 2.

The access opening of the dishwasher 1 according to the invention preferably has a height of at most 300 mm and a width of at most 500 mm and preferably at most 350 mm.

The preferred dimensions of the dishwashers 1 shown in FIGS. 2A-2H, 3A-3H, 4A-4H and 5A-5C are grouped together in the following table.

| | | |
|---|---|---|
| A | 140 to 340 mm | Preferably 200 to 280 mm |
| B | 285 to 485 mm | Preferably 345 to 425 mm |
| C | 400 to 850 mm | Preferably 500 to 600 mm |
| D | 100 to 250 mm | Preferably 120 to 200 mm |
| E | 150 to 300 mm | Preferably 180 to 240 mm |
| F | 100 to 250 mm | Preferably 120 to 200 mm |
| G | 300 to 650 mm | Preferably 350 to 550 mm |
| H | 285 to 485 mm | Preferably 345 to 425 mm |
| I | 150 to 300 mm | Preferably 180 to 240 mm |

The dishwasher 1 is preferably also provided with a splash guard 9, in order to screen the introduction region 4 off from the at least one treatment chamber 3 and in particular also to prevent vapors from escaping.

The invention is not restricted to the exemplary embodiments shown in the drawings, but rather results from a joint consideration of all the features disclosed herein.

What is claimed is:

1. A method for handling a drinking vessel in a coffee shop, the method comprising:

utilizing a dishwasher integrated into a counter of the coffee shop, the dishwasher including an introduction region at which the drinking vessel is introduced to the dishwasher for cleaning, a removal region at which the drinking vessel is removed from the dishwasher after cleaning and at least one treatment zone between the introduction region and the removal region, the at least one treatment zone including at least one nozzle for spraying wash liquid onto the drinking vessel in the at least one treatment zone for cleaning of the drinking vessel, wherein the introduction region and the removal regions are at opposite sides of a housing of the dishwasher;

receiving the drinking vessel into the dishwasher by a customer placing the drinking vessel into the dishwasher via the introduction region;

after the receiving step, cleaning the drinking vessel within the at least one treatment zone;

after the cleaning step, removing the drinking vessel from the dishwasher via the removal region, the removing step carried out by a staff member of the coffee shop; and after the removing step, filling the drinking vessel according an order made by the customer.

2. The method of claim 1, wherein the introduction region faces a front side of the counter and the removal region faces a back side of the counter.

3. The method of claim 1, wherein the dishwasher has in or at the introduction region a system for identifying drinking vessels and that is configured to assign to each drinking vessel in or at the introduction region an identifier that allows unambiguous identification of the drinking vessel.

4. The dishwasher as claimed in claim 3, wherein the system for identifying washware has an RFID device for the automatic and contactless identification of each drinking vessel; and/or wherein the system for identifying washware has a bar-code reader device for the automatic and contactless identification of each drinking vessel; and/or wherein the system for identifying washware has a laser scanner device for the automatic sensing of at least one surface-specific feature characterizing each drinking vessel and thus for the contactless identification of the drinking vessel; and/or wherein the system for identifying washware has a QR code reader device for the automatic and contactless identification of each drinking vessel; and/or wherein the system for identifying washware has an identification device based on the YUV colour model for the automatic and contactless identification of each drinking vessel.

* * * * *